United States Patent
Smith

(10) Patent No.: US 11,348,468 B1
(45) Date of Patent: May 31, 2022

(54) SYSTEMS AND METHODS FOR INHIBITION OF TERRAIN AWARENESS AND WARNING SYSTEM ALERTS

(71) Applicant: Rockwell Collins, Inc., Cedar Rapids, IA (US)

(72) Inventor: Jeshua M Smith, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 247 days.

(21) Appl. No.: 16/355,345

(22) Filed: Mar. 15, 2019

(51) Int. Cl.
  *G08G 5/00* (2006.01)
  *B64D 45/08* (2006.01)
  *G01S 13/935* (2020.01)

(52) U.S. Cl.
  CPC ........... *G08G 5/0021* (2013.01); *B64D 45/08* (2013.01); *G01S 13/935* (2020.01); *G08G 5/0086* (2013.01)

(58) Field of Classification Search
  CPC .. G08G 5/0021; G08G 5/0086; G01S 13/935; B64D 45/08
  See application file for complete search history.

(56) References Cited

U.S. PATENT DOCUMENTS

| | | |
|---|---|---|
| 2,503,412 A | 4/1950 | Purington |
| 2,613,317 A | 10/1952 | Mozley |
| 3,113,310 A | 12/1963 | Standing |
| 3,369,231 A | 2/1968 | Foral |
| 4,023,408 A | 5/1977 | Ryan et al. |
| 4,299,483 A | 11/1981 | Grove et al. |
| 4,348,674 A | 9/1982 | Muth et al. |
| 4,646,244 A | 2/1987 | Bateman et al. |
| 4,894,659 A | 1/1990 | Andrews |
| 4,953,972 A | 9/1990 | Zuk |
| 4,972,195 A | 11/1990 | Markson et al. |
| 5,111,400 A | 5/1992 | Yoder |
| 5,331,330 A | 7/1994 | Susnjara |
| 5,339,085 A | 8/1994 | Katoh et al. |

(Continued)

OTHER PUBLICATIONS

Notice of Allowance for U.S. Appl. No. 15/624,406 dated Oct. 24, 2019. 8 pages.

(Continued)

*Primary Examiner* — Nabil H Syed
*Assistant Examiner* — Cal J Eustaquio
(74) *Attorney, Agent, or Firm* — Suiter Swantz pc llo

(57) ABSTRACT

A method of generating and managing terrain awareness and warning system (TAWS) alerts including determining a number of warnings relating to terrain near an aircraft flight path, each warning indicating terrain above a threshold elevation and having a position associated with the warning. The method further including generating, for each warning, first alert data configured for display as an alert on a display device. The method further including sending the first alert data to the display device, receiving, from the display device, a user request to inhibit a first alert, the first alert based on the first alert data. The method further including generating second alert data for the first alert, wherein the second alert data is configured to inhibit the first alert, wherein inhibiting the first alert includes modifying a display of the first alert on the display device and sending the second alert data to the display device.

12 Claims, 7 Drawing Sheets

(56) References Cited

U.S. PATENT DOCUMENTS

| | | | |
|---|---|---|---|
| 5,448,233 A * | 9/1995 | Saban | G01S 7/4802 340/963 |
| 5,638,282 A | 6/1997 | Chazelle et al. | |
| 5,771,020 A | 6/1998 | Markson et al. | |
| 5,798,713 A | 8/1998 | Viebahn et al. | |
| 5,831,570 A | 11/1998 | Ammar et al. | |
| 5,867,804 A | 2/1999 | Pilley et al. | |
| 5,892,462 A | 4/1999 | Tran | |
| 5,920,276 A | 7/1999 | Frederick | |
| 5,936,552 A | 8/1999 | Wichgers et al. | |
| 5,945,926 A | 8/1999 | Ammar et al. | |
| 5,978,715 A | 11/1999 | Briffe et al. | |
| 6,002,347 A | 12/1999 | Daly et al. | |
| 6,064,942 A | 5/2000 | Johnson et al. | |
| 6,112,141 A | 8/2000 | Briffe et al. | |
| 6,128,553 A | 10/2000 | Gordon et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,201,494 B1 | 3/2001 | Kronfeld | |
| 6,219,594 B1 | 4/2001 | Nicosia et al. | |
| 6,233,522 B1 | 5/2001 | Morici | |
| 6,246,367 B1 | 6/2001 | Markson et al. | |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,308,132 B1 | 10/2001 | Wilson et al. | |
| 6,311,108 B1 | 10/2001 | Ammar et al. | |
| 6,317,468 B1 | 11/2001 | Meyer | |
| 6,345,127 B1 | 2/2002 | Mitchell | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,421,603 B1 | 7/2002 | Pratt et al. | |
| 6,424,288 B1 | 7/2002 | Woodell | |
| 6,426,717 B1 | 7/2002 | Maloratsky | |
| 6,430,480 B1 | 8/2002 | Ammar et al. | |
| 6,441,773 B1 | 8/2002 | Kelly et al. | |
| 6,448,922 B1 | 9/2002 | Kelly | |
| 6,452,511 B1 | 9/2002 | Kelly et al. | |
| 6,456,236 B1 | 9/2002 | Hauck et al. | |
| 6,473,240 B1 | 10/2002 | Dehmlow | |
| 6,483,454 B1 | 11/2002 | Torre et al. | |
| 6,492,934 B1 | 12/2002 | Hwang et al. | |
| 6,501,424 B1 | 12/2002 | Haendel et al. | |
| 6,512,476 B1 | 1/2003 | Woodell | |
| 6,525,674 B1 | 2/2003 | Kelly et al. | |
| 6,531,669 B1 | 3/2003 | Miller et al. | |
| 6,549,161 B1 | 4/2003 | Woodell | |
| 6,567,728 B1 | 5/2003 | Kelly et al. | |
| 6,574,030 B1 | 6/2003 | Mosier | |
| 6,577,947 B1 | 6/2003 | Kronfeld et al. | |
| 6,591,171 B1 | 7/2003 | Ammar et al. | |
| 6,603,425 B1 | 8/2003 | Woodell | |
| 6,650,275 B1 | 11/2003 | Kelly et al. | |
| 6,653,947 B2 | 11/2003 | Dwyer et al. | |
| 6,683,556 B2 | 1/2004 | Block | |
| 6,690,298 B1 | 2/2004 | Barber et al. | |
| 6,690,299 B1 | 2/2004 | Suiter | |
| 6,690,317 B2 | 2/2004 | Szeto et al. | |
| 6,714,186 B1 | 3/2004 | Mosier et al. | |
| 6,738,011 B1 | 5/2004 | Evans | |
| 6,741,203 B1 | 5/2004 | Woodell | |
| 6,741,208 B1 | 5/2004 | West et al. | |
| 6,744,382 B1 | 6/2004 | Lapis et al. | |
| 6,744,408 B1 | 6/2004 | Stockmaster | |
| 6,757,624 B1 | 6/2004 | Hwang et al. | |
| 6,771,626 B1 | 8/2004 | Golubiewski et al. | |
| 6,804,614 B1 | 10/2004 | McGraw et al. | |
| 6,806,846 B1 | 10/2004 | West | |
| 6,819,983 B1 | 11/2004 | McGraw | |
| 6,822,617 B1 | 11/2004 | Mather et al. | |
| 6,839,017 B1 | 1/2005 | Dillman | |
| 6,850,185 B1 | 2/2005 | Woodell | |
| 6,856,908 B2 | 2/2005 | Devarasetty et al. | |
| 6,862,501 B2 | 3/2005 | He | |
| 6,865,452 B2 | 3/2005 | Burdon | |
| 6,879,280 B1 | 4/2005 | Bull et al. | |
| 6,882,302 B1 | 4/2005 | Woodell et al. | |
| 6,918,134 B1 | 7/2005 | Sherlock et al. | |
| 6,950,062 B1 | 9/2005 | Mather et al. | |
| 6,972,727 B1 | 12/2005 | West et al. | |
| 6,977,608 B1 | 12/2005 | Anderson et al. | |
| 6,992,614 B1 | 1/2006 | Joyce | |
| 6,995,726 B1 | 2/2006 | West et al. | |
| 6,998,908 B1 | 2/2006 | Sternowski | |
| 6,999,022 B1 | 2/2006 | Vesel et al. | |
| 7,002,546 B1 | 2/2006 | Stuppi et al. | |
| 7,034,753 B1 | 4/2006 | Elsallal et al. | |
| 7,042,387 B2 | 5/2006 | Ridenour et al. | |
| 7,057,549 B2 | 6/2006 | Block | |
| 7,064,680 B2 | 6/2006 | Reynolds et al. | |
| 7,089,092 B1 | 8/2006 | Wood et al. | |
| 7,092,645 B1 | 8/2006 | Sternowski | |
| 7,098,809 B2 | 8/2006 | Feyereisen et al. | |
| 7,109,912 B1 | 9/2006 | Paramore et al. | |
| 7,109,913 B1 | 9/2006 | Paramore et al. | |
| 7,129,885 B1 | 10/2006 | Woodell et al. | |
| 7,148,816 B1 | 12/2006 | Carrico | |
| 7,151,507 B1 | 12/2006 | Herting | |
| 7,158,072 B1 | 1/2007 | Venkatachalam et al. | |
| 7,161,525 B1 | 1/2007 | Finley et al. | |
| 7,170,446 B1 | 1/2007 | West et al. | |
| 7,196,329 B1 | 3/2007 | Wood et al. | |
| 7,205,933 B1 | 4/2007 | Snodgrass | |
| 7,219,011 B1 | 5/2007 | Barber | |
| 7,242,343 B1 | 7/2007 | Woodell | |
| 7,272,472 B1 | 9/2007 | McElreath | |
| 7,292,178 B1 | 11/2007 | Woodell et al. | |
| 7,312,725 B2 | 12/2007 | Berson et al. | |
| 7,312,743 B2 | 12/2007 | Ridenour et al. | |
| 7,479,920 B2 | 1/2009 | Niv | |
| 7,486,291 B2 | 2/2009 | Berson et al. | |
| 7,515,087 B1 | 4/2009 | Woodell et al. | |
| 7,570,177 B2 | 8/2009 | Reynolds et al. | |
| 7,609,200 B1 | 10/2009 | Woodell et al. | |
| 7,633,430 B1 | 12/2009 | Wichgers et al. | |
| 7,639,175 B1 | 12/2009 | Woodell | |
| 7,672,783 B2 | 3/2010 | Oettinger | |
| 7,675,461 B1 | 3/2010 | McCusker et al. | |
| 7,688,254 B2 | 3/2010 | Khatwa | |
| 8,019,491 B1 | 9/2011 | McCusker | |
| 8,160,757 B1 | 4/2012 | Frank et al. | |
| 8,232,910 B1 | 7/2012 | Burton | |
| 8,554,264 B1 | 10/2013 | Gibbons et al. | |
| 2002/0138194 A1 | 9/2002 | Flynn et al. | |
| 2003/0071828 A1 | 4/2003 | Wilkins et al. | |
| 2003/0132876 A1 | 7/2003 | Block | |
| 2003/0156046 A1 | 8/2003 | Dwyer et al. | |
| 2003/0216859 A1 | 11/2003 | Martell et al. | |
| 2004/0044445 A1 | 3/2004 | Burdon | |
| 2004/0059473 A1 | 3/2004 | He | |
| 2004/0083038 A1 | 4/2004 | He | |
| 2004/0093131 A1 * | 5/2004 | Block | G01C 5/005 701/9 |
| 2004/0160341 A1 | 8/2004 | Feyereisen et al. | |
| 2004/0178943 A1 | 9/2004 | Niv | |
| 2004/0181318 A1 | 9/2004 | Redmond et al. | |
| 2004/0189492 A1 * | 9/2004 | Selk, II | G01C 23/00 340/973 |
| 2005/0174350 A1 | 8/2005 | Ridenour et al. | |
| 2006/0097895 A1 | 5/2006 | Reynolds et al. | |
| 2006/0227012 A1 | 10/2006 | He | |
| 2006/0238402 A1 | 10/2006 | Khatwa | |
| 2006/0253231 A1 | 11/2006 | Khatwa | |
| 2006/0290531 A1 | 12/2006 | Reynolds et al. | |
| 2007/0171094 A1 | 7/2007 | Alter et al. | |

(56) References Cited

U.S. PATENT DOCUMENTS

| | | | |
|---|---|---|---|
| 2007/0247350 A1 | 10/2007 | Ryan | |
| 2009/0121901 A1 | 5/2009 | Namier et al. | |
| 2009/0207048 A1 | 8/2009 | He et al. | |
| 2010/0004801 A1 | 1/2010 | Flotte et al. | |
| 2010/0033499 A1 | 2/2010 | Gannon et al. | |
| 2010/0042273 A1* | 2/2010 | Meunier | G05D 1/0676 701/9 |
| 2010/0070110 A1 | 3/2010 | Badli et al. | |
| 2010/0070176 A1 | 3/2010 | Feyereisen et al. | |
| 2010/0125381 A1 | 5/2010 | Botargues et al. | |
| 2010/0231705 A1 | 9/2010 | Yahav et al. | |
| 2011/0184635 A1 | 7/2011 | Khatwa et al. | |
| 2011/0313597 A1 | 12/2011 | Wilson et al. | |
| 2013/0204523 A1* | 8/2013 | He | G01C 23/005 701/527 |

OTHER PUBLICATIONS

U.S. Appl. No. 11/900,002, filed Sep. 6, 2007, Woodell et al.
Corrected Notice of Allowance on U.S. Appl. No. 14/489,230 dated May 11, 2016, 2 pages.
Final Office Action for U.S. Appl. No. 11/897,844 dated Apr. 13, 2011. 7 pages.
Final Office Action for U.S. Appl. No. 11/863,215 dated May 27, 2009. 5 pages.
Final Office Action for U.S. Appl. No. 11/897,844 dated Mar. 11, 2010. 9 pages.
Final Office Action on U.S. Appl. No. 14/464,547 dated Jun. 16, 2016, 8 pages.
Final Office Action for U.S. Appl. No. 15/624,406 dated Jul. 29, 2019.
Fountain, J.R., Digital Terrain Systems, Airborne Navigation Systems Workshop (Digest No. 1997/169), IEE Colloquium, pp. 4/1-4/6, Feb. 21, 1997.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
McShea, Robert, "Terrain Awareness and Warning System", Test and Evaluation of Aircraft Avionics and Weapons Systems, Institution of Engineering and Technology, 2015, p. 382-389 (Year 2015).
National Transportation Safety Board, NTSB Identification: ANC14MA008, https://www.ntsb.gov/_layouts/ntsb.aviation/brief2.aspx?ev_id=20131130X23954&ntsbno=ANC14MA008&akey=1, 4 pages.
National Transportation Safety Board, Safety Recommendation A-18-014, https://www.ntsb.gov/_layouts/ntsb.recsearch/Recommendation.aspx?Rec=A-18-014, 2 pages.
Non-Final Office Action for U.S. Appl. No. 11/863,215 dated Nov. 12, 2008. 8 pages.
Non-Final Office Action for U.S. Appl. No. 11/897,844 dated Dec. 29, 2011. 7 pages.
Non-Final Office Action for U.S. Appl. No. 11/897,844 dated Nov. 8, 2010. 9 pages.
Non-Final Office Action for U.S. Appl. No. 11/897,844 dated May 11, 2009. 12 pages.
Non-Final Office Action for U.S. Appl. No. 15/624,406 dated Feb. 5, 2019. 16 pages.
Non-Final Office Action on U.S. Appl. No. 14/464,547 dated Jan. 21, 2016, 8 pages.
Non-final office action received in U.S. Appl. No. 14/489,230 dated Sep. 30, 2015, 9 pages.
Notice of Allowance for U.S. Appl. No. 11/863,215 dated Oct. 13, 2009.
Notice of Allowance on U.S. Appl. No. 14/464,547 dated Aug. 31, 2016, 9 pages.
Notice of Allowance on U.S. Appl. No. 14/489,230 dated Mar. 15, 2016, 5 pages.
Office Action for U.S. Appl. No. 11/851,323, dated Dec. 15, 2010, 13 pages.
Office Action for U.S. Appl. No. 11/851,323, dated Aug. 6, 2009, 23 pages.
Office Action on U.S. Appl. No. 11/787,460, dated Mar. 19, 2010, 16 pages.
Office Action on U.S. Appl. No. 11/787,460, dated Sep. 16, 2009, 15 pages.
Office Action U.S. Appl. No. 11/787,460, dated Aug. 31, 2010, 18 pages.
Spitzer et al., "Fundamentals of Terrain Avoidance Warning", Digital Avionics Handbook, Taylor & Francis, 2016, p. 21-2 to 21-10.
Technical Standard Order, TSO-C115b, Airborne Area Navigation Equipment Using Multi-Sensor Inputs, Department of Transportation, Federal Aviation Administration, Sep. 30, 1994, 11 pages.
U.S. Office Action on U.S. Appl. No. 11/900,002 dated Jun. 8, 2010, 7 pages.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.

* cited by examiner

SYSTEMS AND METHODS FOR INHIBITION OF TERRAIN AWARENESS AND WARNING SYSTEM ALERTS

BACKGROUND

The inventive concepts disclosed herein relate generally to the field of terrain awareness for aircraft. More particularly, embodiments of the inventive concepts disclosed herein relate to systems and methods to generate and manage alerts regarding potentially dangerous terrain near aircraft.

Terrain awareness and warning systems (TAWS) monitor terrain near an aircraft and provide information regarding terrain of potential danger to the aircraft. For instance, such systems may compare an altitude of the aircraft to elevation of terrain near the aircraft and provide an indication of terrain that has a high enough elevation to be of potential concern to the pilot. However, traditional TAWS are prone to nuisance alerts. For example, a traditional TAWS may provide multiple false alerts during periods of high pilot workload such as approach and landing. As a result, many pilots enable a TAWS inhibition switch to inhibit TAWS alerts. However, inhibiting TAWS alerts to reduce nuisance alerts also stops legitimate non-nuisance alerts which can prevent accident. Thus, there is a need for a system that provides TAWS alerts and allows a pilot to review and inhibit individual alerts while keeping other alerts active.

SUMMARY

In one aspect, the inventive concepts disclosed herein are directed to a method of generating and managing terrain awareness and warning system (TAWS) alerts including determining a number of warnings relating to terrain near an aircraft flight path, each warning indicating terrain above a threshold elevation and having a position associated with the warning. The method further including generating, for each warning, first alert data configured for display as an alert on a display device. The method further including sending the first alert data to the display device, receiving, from the display device, a user request to inhibit a first alert, the first alert based on the first alert data. The method further including generating second alert data for the first alert, wherein the second alert data is configured to inhibit the first alert, wherein inhibiting the first alert includes modifying a display of the first alert on the display device and sending the second alert data to the display device.

In some embodiments wherein the first alert is already inhibited, the second alert data is configured to uninhibit the first alert. In some embodiments, determining the number of warnings includes comparing flight management system (FMS) data to TAWS data. In some embodiments, the flight management system (FMS) data is a flight path and the TAWS data is terrain database data, wherein the flight path includes a vertical profile, intended speed, and intended angle of attack, and wherein the terrain database data includes terrain element data associated with a location. In some embodiments, inhibiting the first alert includes modifying an audio or tactile representation of the first alert. In some embodiments, generating the alert data includes inhibiting one or more alerts by default based on one or more rules. In some embodiments, the one or more rules include an altitude comparison, wherein the altitude comparison will inhibit the one or more alerts if the aircraft flight path at an alert location is above a threshold altitude. In some embodiments, modifying the display of the first alert includes modifying a color of the alert.

In a further aspect, the inventive concepts disclosed herein are directed to a system for generating and managing terrain awareness and warning system (TAWS) alerts including a display device, and a processing circuit coupled to the display. The processing circuit including a processor and memory, the memory having instructions stored thereon that, when executed by the processor, cause the processor to determine a number of warnings relating to terrain near an aircraft flight path, each warning indicating terrain above a threshold elevation and having a position associated with the warning. The instructions further cause the processor to generate, for each warning, first alert data configured for display as an alert on the display device, send the first alert data to the display device, receive, from the display device, a user request to inhibit a first alert, the first alert based on the first alert data. The instructions further cause the processor to generate second alert data for the first alert, wherein the second alert data is configured to inhibit the first alert, wherein inhibiting the first alert includes modifying a display of the first alert on the display device, and send the second alert data to the display device.

In some embodiments wherein the first alert is already inhibited, the second alert data is configured to uninhibit the first alert. In some embodiments, determining the number of warnings includes comparing flight management system (FMS) data to TAWS data. In some embodiments, the flight management system (FMS) data is a flight path and the TAWS data is terrain database data, wherein the flight path includes a vertical profile, intended speed, and intended angle of attack, and wherein the terrain database data includes terrain element data associated with a location. In some embodiments, the TAWS data is radar data. In some embodiments, generating the alert data includes inhibiting one or more alerts by default based on one or more rules. In some embodiments, the one or more rules include an altitude comparison, wherein the altitude comparison will inhibit the one or more alerts if the aircraft flight path at an alert location is above a threshold altitude. In some embodiments, modifying the display of the first alert includes modifying a color of the alert.

In a further aspect, the inventive concepts disclosed herein are directed to a terrain awareness and warning system (TAWS) including a terrain database, the terrain database including terrain element data associated with a location and a processing circuit. The processing circuit including a processor and memory, the memory having instructions stored thereon that, when executed by the processor, cause the processor to receive, from a flight management system, a flight path, wherein the flight path includes a vertical profile, intended speed, and intended angle of attack. The instructions further cause the processor to determine, based on the flight path, a number of warnings related to terrain near the flight path, each warning indicating terrain above a threshold elevation and having a position associated with the warning. The instructions further cause the processor to generate, for each warning, first alert data configured for display as an alert on a display device, send the first alert data to the display device, receive, from the display device, a user request to inhibit a first alert, the first alert based on the first alert data, generate second alert data for the first alert, wherein the second alert data is configured to inhibit the first alert, wherein inhibiting the first alert includes modifying a display of the first alert on the display device, and send the second alert data to the display device.

In some embodiments wherein the first alert is already inhibited, the second alert data is formatted to uninhibit the first alert. In some embodiments, modifying the display of the first alert includes modifying a color of the alert. In some embodiments, the memory further includes one or more rules, the one or more rules determining an inhibition state of the alert data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
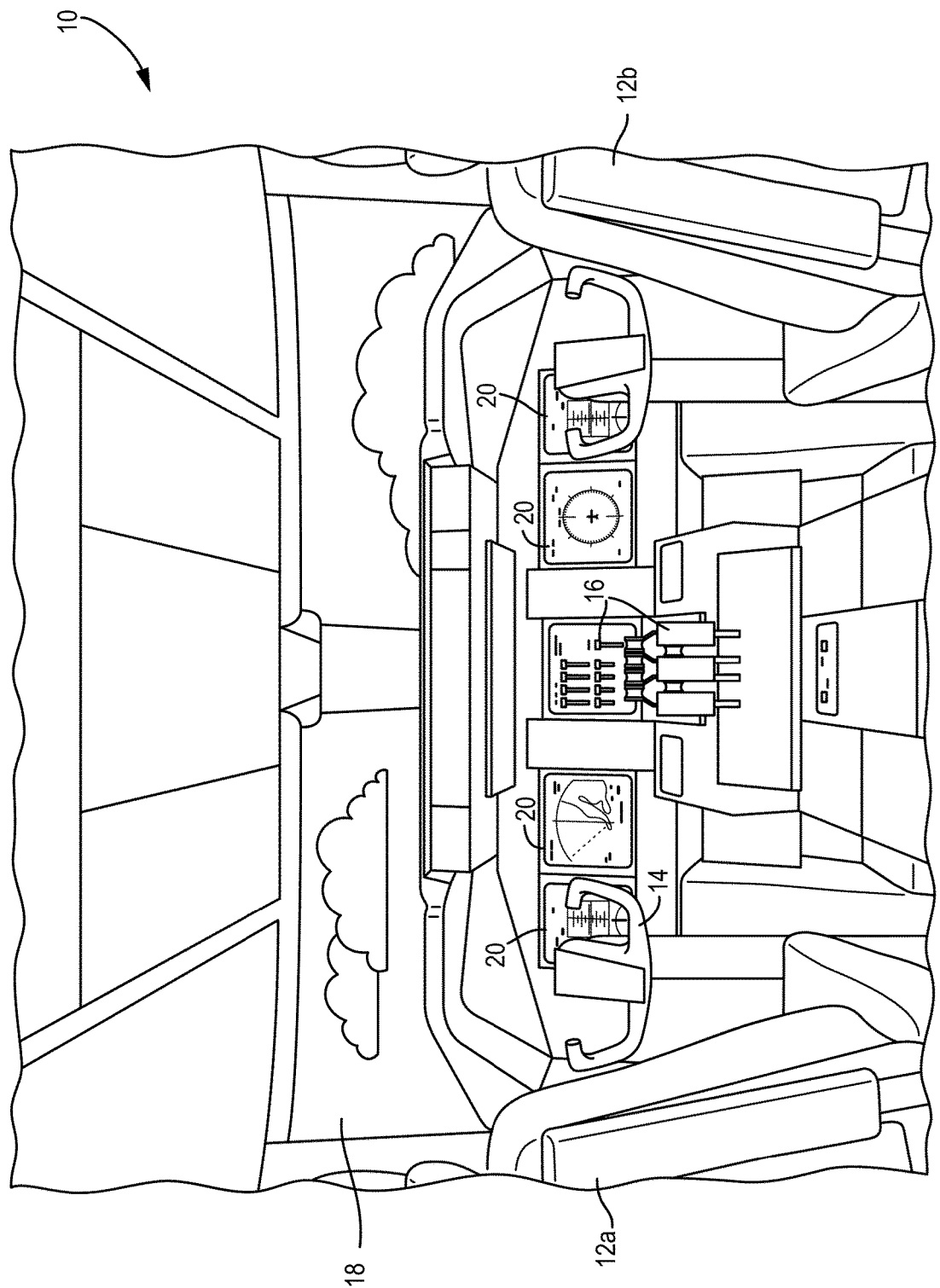
FIG. 1 is a schematic illustration of a cockpit of an aircraft, according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for inhibition of terrain awareness and warning system (TAWS) alerts. The inventive concepts disclosed herein can be utilized in a number of alerting systems, sensing systems, and display systems. While the present disclosure describes systems and methods implementable for a federated TAWS, the inventive concepts disclosed herein may be used in any type of environment (e.g., in another aircraft, a spacecraft, a ground-based vehicle, or a non-vehicle application such as a ground-based display system, an air traffic control system, a radar system, a virtual display system). While certain examples and embodiments of the inventive concepts disclosed herein are described with respect to a pilot of an aircraft, it will be appreciated that others than a pilot may use and benefit from the inventive concepts disclosed herein with respect to other vehicles, systems, and objects.

Referring now to FIG. 1, cockpit 10 of an airplane is shown. Cockpit 10 may include pilot seat 12a, co-pilot seat 12b, aircraft control stick 14, plurality of flight controls 16, and flight displays 20. The pilot sitting in pilot seat 12a may utilize aircraft control stick 14 to maneuver the airplane in an upwardly motion, downwardly motion, banking to the left, banking to the right or any combination thereof. The pilot can visually monitor the flight path through windshield 18. However, when the pilot utilizes windshield 18, her visual range is limited.

The crew utilizes flight displays 20 to increase their visual range and to enhance their decision-making abilities. In an exemplary embodiment, flight displays 20 may be configured to show weather, terrain, fixed obstacles, variable obstacles (i.e., other airplanes), flight characteristics (i.e., altitude or speed), or any combination thereof.

Flight displays 20 may be touch controlled displays that can be used by the pilot or co-pilot to interact with aircraft systems by touching the display screen with a stylus/pen and/or one or more fingers. For example, a tap of a display of flight displays 20 by a pilot, brings up a context-sensitive menu that let the pilot control things such as speed, altitude and heading of the aircraft. In a further embodiment of the invention, the touch controlled displays are multi-touch controlled such that flight displays 20 are operative to detect a simultaneous presence of more than one point of contact (i.e., multiple contacts) on the display surface. Such multi-touch enabled display surfaces are also known as gesture-controlled display surfaces. Flight displays 20, being multi-touch enabled, can detect various known gestures such as tap, double tap, pinch, zoom, rotate, long press, pan, scroll, flick, two finger tap, two finger scroll, to name a few. For example, the pilot can input a gesture such as a couple of taps on flight displays 20, by which the screen layout can be split into two, three, or four windows and the elements of the individual windows can be customized by dragging and dropping icons to provide new information. The touch controlled interface of flight displays 20 makes the cockpit more user-friendly.

It should be noted that the term aircraft, as utilized herein, may include any manned or unmanned object capable of flight. Examples of aircraft may include, but are not limited to, fixed-wing aerial vehicles (e.g., propeller-powered or jet-powered), rotary-wing aerial vehicles (e.g., helicopters), manned aircraft, unmanned aircraft (e.g., unmanned aerial vehicles, or UAVs), etc.

For the purposes of the present disclosure, the term terrain includes any type of object or obstacle that could present a risk of collision to an aircraft. Examples of terrain include, but are not limited to, ground, hills, mountains, trees, rock formations, buildings, utility/transmission towers, etc. Terrain may be naturally occurring or man-made.

Figure 2:
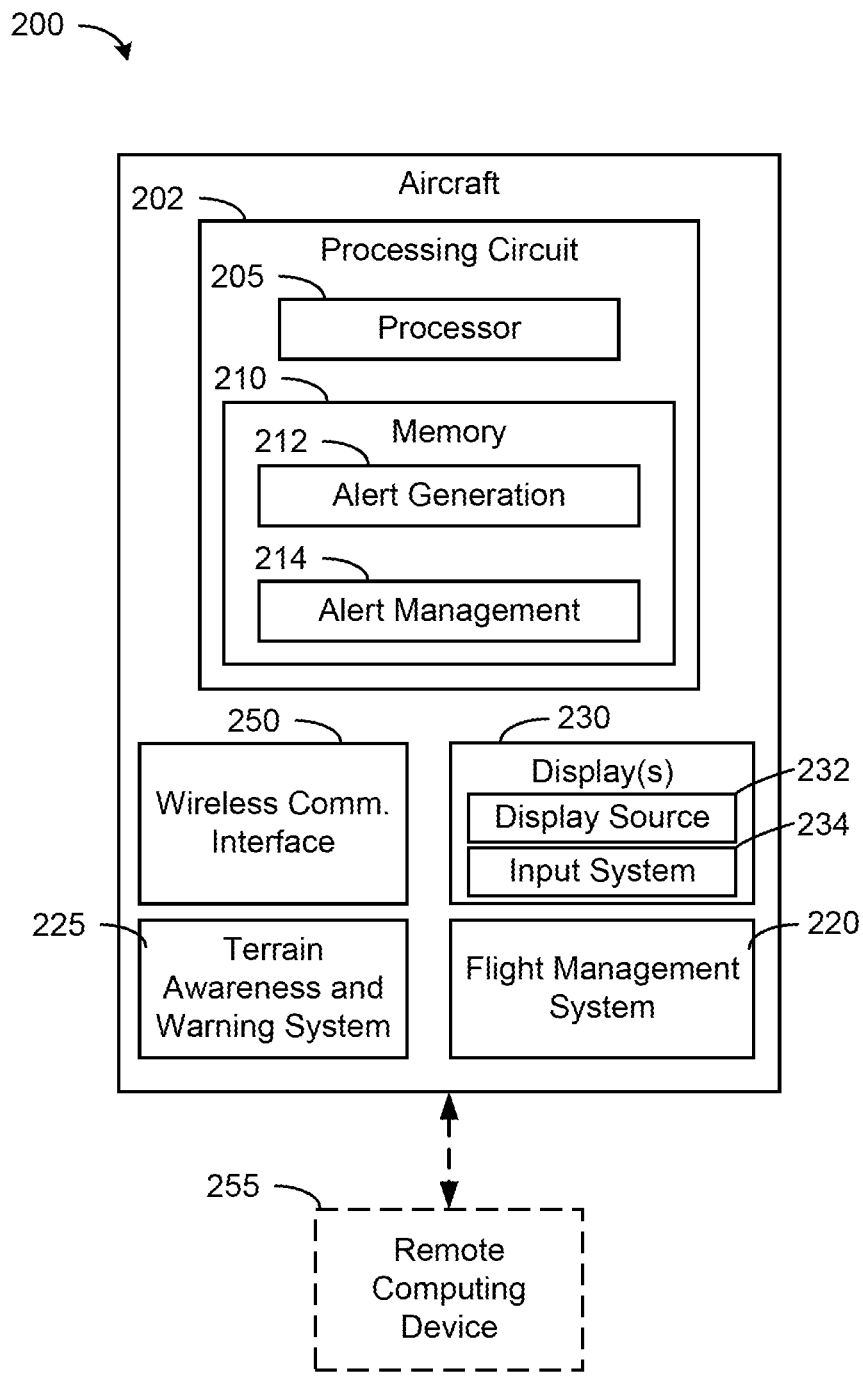
FIG. 2 is a block diagram of an aircraft configured to generate and manage terrain alerts, according to an exemplary embodiment.

Referring now to FIG. 2, a block diagram of aircraft 200 having processing circuit 202 for generating and managing TAWS alerts is shown according to an exemplary embodiment. Aircraft 200 may include a flight management system (FMS) 220, terrain awareness and warning system (TAWS) 225, one or more displays 230, and wireless communications interface 250. Processing circuit 202 may be integrated with FMS 220, TAWS 225, display(s) 230 and/or a combination thereof. In some embodiments, processing circuit 202 is standalone or is federated to be easily integrated with other systems.

FMS 220 may automate a variety of in-flight tasks and reduce flight crew workload. For example, FMS 220 may create and manage a flight plan to guide the aircraft from a first location to a second location. FMS 220 may include a navigation database containing elements from which the flight plan is constructed. For example, FMS 220 may include waypoints, airways, airports, runways, holding patterns, standard terminal arrivals, radio navigation aids, and/or ARINC 424 navigation system data base standard compliant data. FMS 220 may be coupled to or integrated with processing circuit 202 such that FMS 220 may provide flight plan or other FMS data to processing circuit 202. For example, FMS 220 may send full performance vertical navigation (VNAV) data including pitch axis data and throttle data to processing circuit 202.

In some embodiments, FMS 220 may include one or more position/navigation systems such as an onboard Embedded Global Positioning System/Inertial Navigation System (EGI). In some embodiments, FMS 220 may include an air data system (e.g., an air data computer) that may collect data regarding wind, air speed, turbulence, and/or other air-related data.

TAWS 225 may use digital elevation data and aircraft instrument values to predict aircraft intersection with terrain and alert flight crew to reduce the risk of controlled flight into terrain. TAWS 225 may include a ground proximity warning system (GPWS), enhanced ground proximity warning system (EGPWS), and/or other system to generate TAWS alerts. TAWS 225 may generate alerts based on radar data, terrain database data, and/or other geospatial data. For example, TAWS 225 may compare an altitude of a terrain element in a terrain database to an altitude of the aircraft at the same location and generate an alert if the altitude of the aircraft at the location is less than the altitude of the terrain at the same location. TAWS 225 may be coupled to or integrated with processing circuit 202 such that TAWS 225 may provide terrain data or other TAWS data to processing circuit 202. For example, TAWS 225 may send terrain database data including terrain element locations and altitudes to processing circuit 202.

In some embodiments, TAWS 225 may be configured to collect (e.g., directly sense) data regarding one or more terrain features proximate to aircraft 200 that may pose a risk to aircraft 200. In some embodiments, TAWS 225 may be or include a radar (e.g., millimeter-wave, or MMW, radar system) or LIDAR system. In some embodiments, TAWS 225 may be or include a weather radar system configured to detect features of terrain around aircraft 200.

Displays 230 may be one of flight displays 20 or a different display altogether. Displays 230 may present visual information to a pilot and/or co-pilot of an aircraft and may receive user input therefrom, as described in detail with reference to FIG. 1. Furthermore, displays 230 may produce and transmit data including one or more data types to processing circuit 202. In some embodiments, displays 230 include display source 232 and input system 234. Display source 232 may be configured to present visual media (LED light, text, graphics, etc.) via light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), and/or any other suitable display technology. In some embodiments, display source 232 may be a touchscreen display.

Input system 234 may be configured to receive input from a user, as described in detail with reference to FIG. 1. For example, input system 234 may be configured to detect touch and other gestures of a user. In this regard, input system 234 may be configured with a touch-sensitive panel layered on top of an electronic visual display (i.e., display source 232). Input system 234 may use a variety of touch-sensing technologies configured to receive a user input, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, and/or any other suitable touch-sensitive technology. In some embodiments, input system 234 is a touchscreen. In some embodiments, input system 234 is or includes one or more keyboards, trackpads, joysticks, pointing sticks, mice, and/or other input devices.

Wireless communication interface 250 may be configured to allow communication with other devices/platforms. In some embodiments, aircraft 200 may transmit data to a remote computing device 255 (e.g., a computing device at a control tower) using wireless communication interface(s) 250. In some embodiments, aircraft 200 may receive FMS data from remote computing device 255 via wireless communications interface 250. For example, an air traffic controller may send a flight plan to aircraft 200 via wireless communications interface 250.

Processing circuit 202 may be configured to generate and manage TAWS alerts. Processing circuit 202 may receive data from FMS 220 and TAWS 225 and determine warnings related to terrain near the flight path of aircraft 200 as described in detail with reference to FIG. 3. Processing circuit 202 may generate alert data formatted for display as alerts on a display screen (e.g., displays 230). Processing circuit 202 may manage one or more TAWS alerts and allow flight crew to individually inhibit (e.g., silence, minimize, turn off, delay) one or more of the TAWS alerts. For example, a pilot could inhibit an individual nuisance TAWS alert while maintaining a number of other legitimate TAWS alerts instead of inhibiting all TAWS alerts via a TAWS inhibition switch. In some embodiments, processing circuit 202 may allow for identification, generation, and display of TAWS alerts on a display of aircraft 200 (e.g., displays 230) in advance of aircraft 200 encountering the TAWS alerts so that flight crew have an enhanced warning of the TAWS alerts and can review the TAWS alerts for relevance and accuracy. For example, processing circuit 202 may receive a fight plan from FMS 220 while the aircraft 200 is preparing for departure, compare the flight path to a terrain database of TAWS 225, generate TAWS alerts based on the comparison, and display the TAWS alerts overlaid the flight plan display of FMS 220 for the flight crew to review and manage the TAWS alerts before takeoff.

Processing circuit 202 may include processor 205 and memory 210. Processor 205 may be implemented as a specific purpose processor, an application specific integrated circuit (ASIC), one or more field programmable gate arrays (FPGAs), a group of processing components, or other suitable electronic processing components. Memory 210 may be one or more devices (e.g., RAM, ROM, flash memory, hard disk storage, registers) for storing data and computer code for completing and facilitating the various user or client processes, layers, and modules described in the present disclosure. Memory 210 may be or include volatile memory or non-volatile memory and may include database components, object code components, script components, or any other type of information structure for supporting the various activities and information structures of the inventive concepts disclosed herein. Memory 210 may be communicably connected to processor 205 and may include computer code or instruction modules for executing one or more processes described herein.

Memory 210 can include various modules and/or services that cause processor 205 to execute the systems and methods described herein. Memory 210 can include alert generation 212 and alert management 214. Alert generation 212 may generate one or more TAWS alerts for display on a display of aircraft 200 (e.g., displays 230). In some embodiments, alert generation 212 compares FMS data to TAWS data to generate alerts. In some embodiments, alert generation 212 determines a default inhibition state of the TAWS alerts when generated. For example, alert generation 212 may default any TAWS alerts associated with being above a threshold altitude to an inhibited state.

Alert management 214 may manage one or more TAWS alerts. Alert management 214 may allow flight crew to view parameters relating to TAWS alerts and inhibit individual TAWS alerts. For example, alert management 214 may allow a pilot to select a TAWS alert she suspects to be a nuisance alert, confirm that the selected TAWS alert is a nuisance alert by viewing the alert parameters, and inhibit the alert. For the purposes of the present disclosure, alarm inhibition includes any method of silencing, suppressing, diminishing or otherwise reducing the notification of an alarm. Examples of alarm inhibition include, but are not limited to, changing a visual representation of an alarm (e.g., an opacity, a color, a symbol, a weight, a brightness, etc.), changing an auditory representation of an alarm (e.g., a volume, a tone, a frequency, etc.), changing a haptic representation of an alarm (e.g., a vibration, a temperature, etc.), etc.

Figure 3:
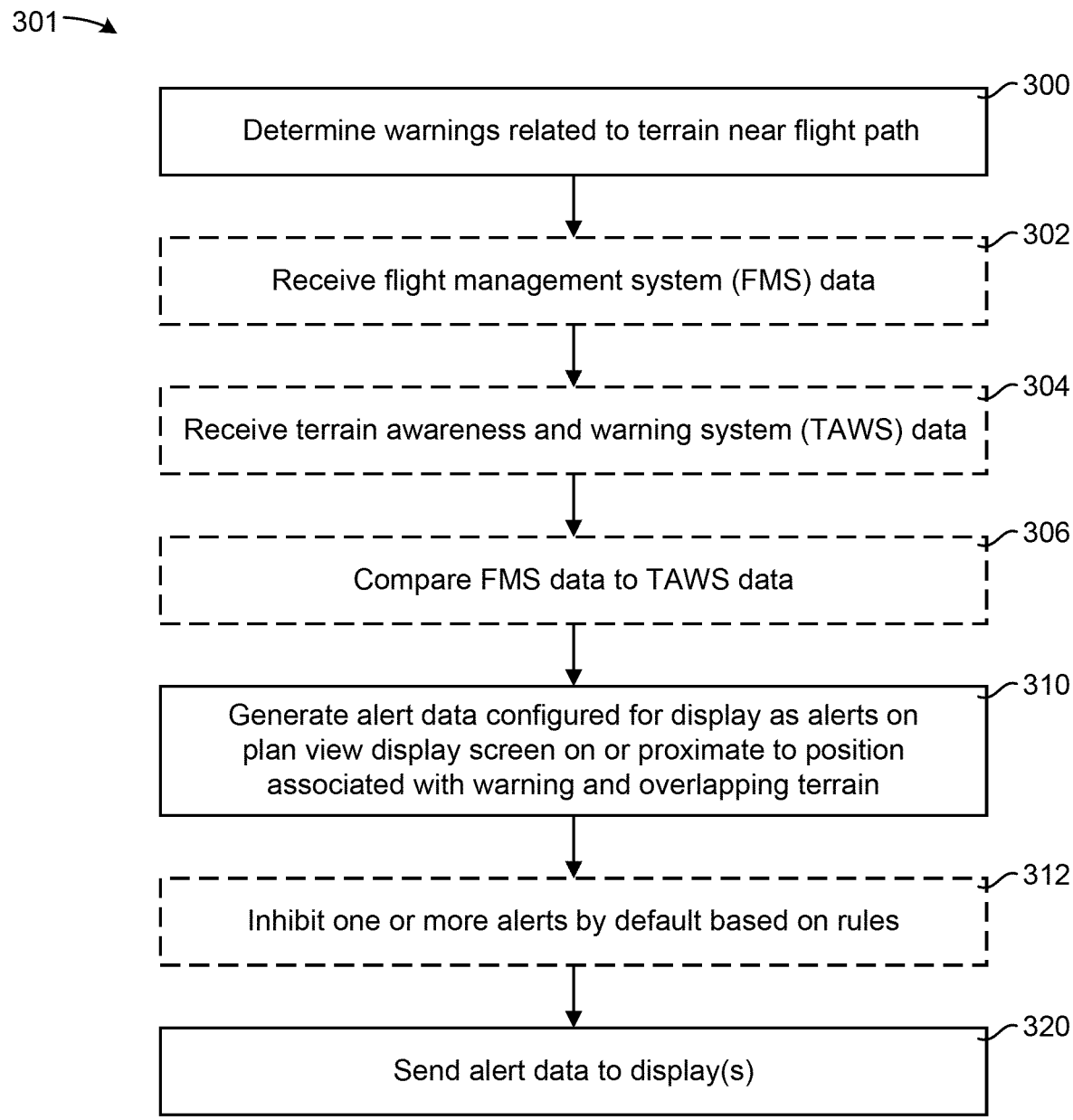
FIG. 3 is a flow diagram of process for generating alert data by the aircraft of FIG. 2, according to an exemplary embodiment.

Referring now to FIG. 3, process 301 for generating alert data is shown, according to an exemplary embodiment. Processing circuit 202 may perform process 301. In some embodiments, process 301 occurs whenever the flight path of aircraft 200 changes. In some embodiments, process 301 occurs on a routine or timely basis (e.g., every minute). Process 301 may allow flight crew to view TAWS alerts before they happen. In some embodiments, process 301 may account for changes in aircraft performance or deviations from a current flight path. For example, process 301 may update an altitude trajectory of the aircraft based on a one engine inoperative (OEI) performance deviation. At step 300, processing circuit 202 may determine warnings related to terrain near a flight path of aircraft 200. Steps 302-306 provide one exemplary embodiment of step 300, however step 300 may be achieved in various fashions and therefore steps 302-306 should not be taken as limiting possible implementations of step 300.

At step 302, processing circuit 202 may receive flight management system (FMS) data from flight management system 220. FMS data may include flight path data such as flight waypoints and flight vectors, and aircraft performance data such as engine temperature, engine status, fan speeds, etc. At step 304, processing circuit 202 may receive terrain awareness and warning system (TAWS) data from terrain awareness and warning system (TAWS) 225. TAWS data may include terrain database data, radar data or other geospatial data. In some embodiments, TAWS data may be received from an external source (e.g., remote computing device 255 via wireless communication interface 250) such as a remote server, satellite, or air traffic control tower.

At step 306, processing circuit 202 may compare the FMS data to the TAWS data. Comparing the FMS data to the TAWS data may include comparing an altitude of a flight path to an altitude of a terrain element at a specific location. For example, processing circuit 202 may search a terrain database for terrain elements near a flight path provided by FMS 220 and compare the altitude of each terrain element to the altitude indicated by the flight path at that terrain element. In some embodiments, processing circuit 202 may adjust the comparison based on aircraft performance data. For example, processing circuit 202 may account for engine overload by reducing the altitude associated with the aircraft flight path at a specific location.

At step 310, processing circuit 202 may generate alert data configured for display as alerts on display(s) 230. Alert data may be displayed on display(s) 230 proximate to a position associated with the terrain element. For example, a topographical map depicting a flight path going over a mountain may display an alert at the intersection of the mountain and the flight path. In some embodiments, a terrain element may affect a section of a flight path instead of a single point, therefore the alert data may be configured to change a representation of the section of the flight path affected. For example, a flight path may intersect a jet stream in which case processing circuit 202 may highlight the section of the flight path that intersects with the jet stream. Display of alert data is described in greater detail with reference to FIGS. 5-7.

At step 312, processing circuit 202 may automatically set the default representation of one or more alerts to an inhibited state based on rules. In some embodiments, processing circuit 202 may include one or more rules. The one or more rules may be configured to determine a default inhibition state of the alerts of step 310. A rule may set an alert to a default inhibited state based on what phase of flight the alert is associated with. For example, an alert may be automatically set to a default inhibited state if the alert occurs during a cruising phase of the flight path. The one or more rules allow processing circuit 202 to reduce a number of nuisance alerts while still retaining alert data for the flight crew. For example, a pilot may select a default inhibited alert to view further details and confirm that the alert is non-threatening.

At step 320, processing circuit 202 may send the alert data to display(s) 230. Display(s) 230 may be configured to display the alert data as alerts on a plan view display screen. For example, display(s) 230 may display the alert data as exclamation symbols overlapping the flight path of FMS 220 at locations corresponding to the terrain elements associated with each alert.

Figure 4:
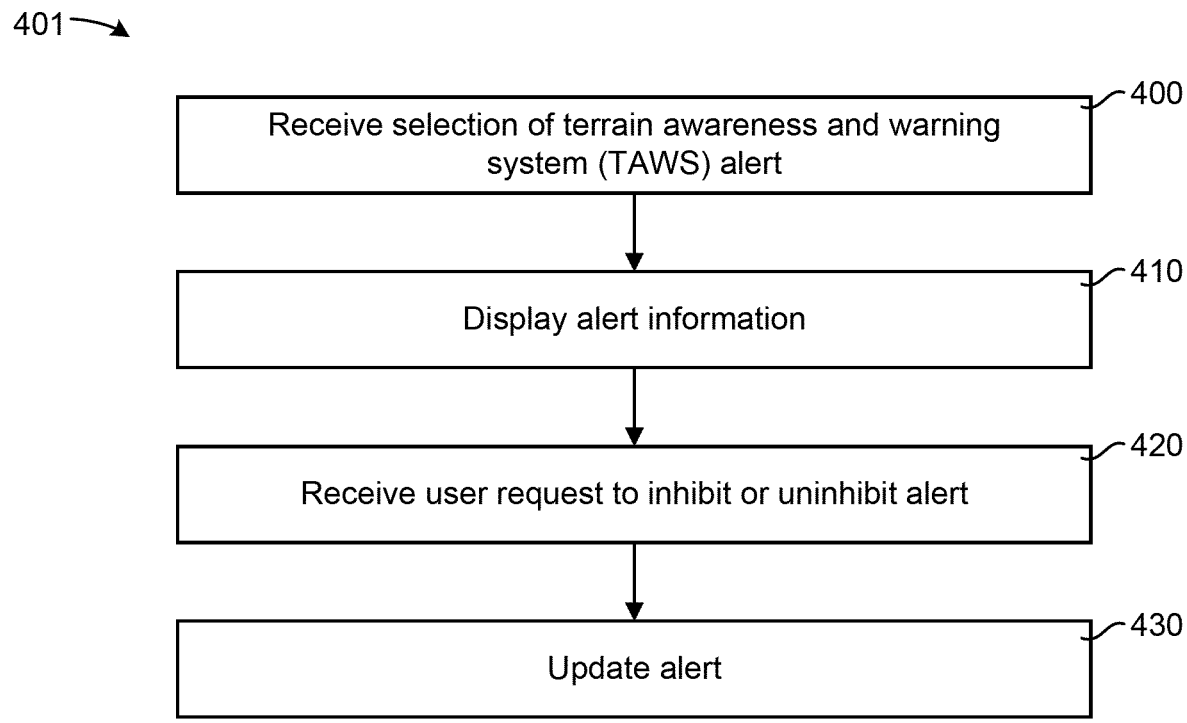
FIG. 4 is a flow diagram of process for managing the alert data of FIG. 3, according to an exemplary embodiment.

Referring now to FIG. 4, process 401 for managing alert data is shown, according to an exemplary embodiment. Processing circuit 202 may perform process 401. Process 401 may allow flight crew to view details related to a TAWS alert and individually inhibit a TAWS alert. At step 400, processing circuit 202 may receive a selection of a TAWS alert. Processing circuit 202 may receive a selection from TAWS 225, FMS 220, and/or display(s) 230. In some embodiments, TAWS alerts may be managed by an external source such as via remote computing device 255. In some embodiments, a user selects a TAWS alert by tapping the symbol associated with the TAWS alert.

At step 410, processing circuit 202 may display alert information associated with the selected TAWS alert. For example, processing circuit 202 may display an elevation, tags, description, and/or current status of a terrain element associated with the selected TAWS alert. The alert information may allow flight crew to discern a threat posed by the terrain element. For example, a flagpole with an associated elevation of 25 feet may be known to be nonthreatening to the function of the aircraft at cruising altitude.

At step 420, processing circuit 202 may receive a user request to change an inhibition state of the selected TAWS alert. An uninhibited TAWS alert may display an "inhibit" option and an inhibited TAWS alert may display an "uninhibit" option. A user may inhibit an uninhibited TAWS alert by selecting an "inhibit" option. At step 430, in response to the user request the selected TAWS alert may be updated. For example, processing circuit 202 may update an inhibition status of the selected TAWS alert. Updating an inhibition status may include removing an alert symbol or changing a color of the flight path as described in greater detail with reference to FIG. 2.

Figure 5:
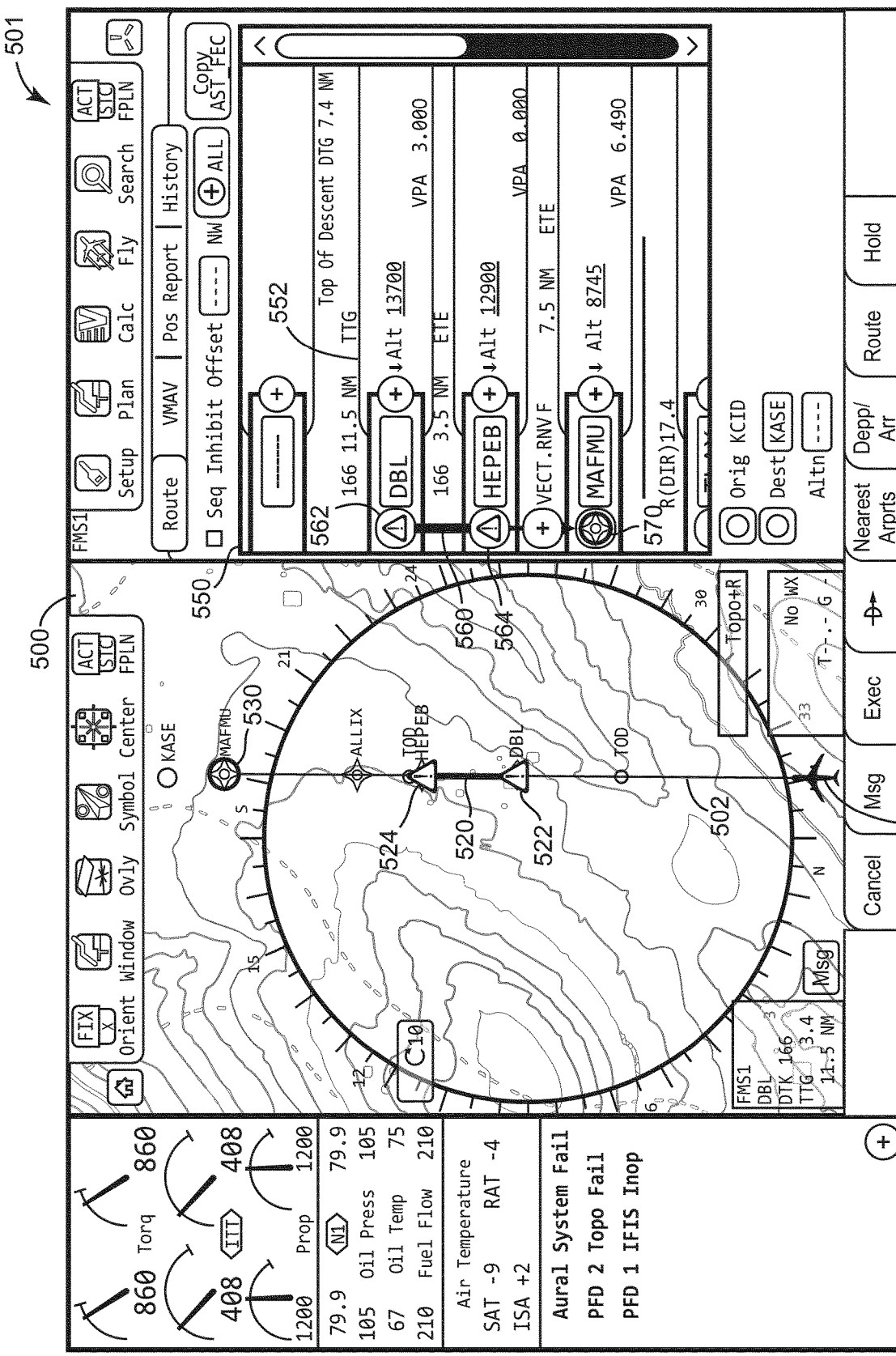
FIG. 5 is an illustration of a display screen showing the alert data of FIG. 3, according to an exemplary embodiment.

Referring now to FIG. 5, display screen 501 for alert data is shown, according to an exemplary embodiment. Display screen 501 may be a display of display(s) 230. Display screen 501 may be one of flight displays 20. Display screen 501 may be configured to display TAWS alerts and allow a user to view and manage the TWAS alerts. Display screen 501 may include map view 500 and details view 550. Map view 500 may be configured to display a topographical map of the flight path of the aircraft. Map view 500 may include, aircraft 510, flight path 502, destination 530, and one or more TAWS alerts 520-524.

Aircraft 510 can be a visual representation of the aircraft (e.g., aircraft 200). Aircraft 510 may be centrally located on map view 500 such that map view 500 provides context of the entire area surrounding the aircraft. Flight path 502 may connect aircraft 510 to destination 530. Flight path 502 may be a line or other representation showing the flight path for the aircraft on map view 500. Flight path 502 may be determined by FMS 220. Flight path 502 may include a TAWS alert 520. TAWS alert 520 is a visual representation of a TAWS alert along the flight path. For example, TAWS alert 520 may be a section of flight path 502 that intersects with a terrain element such as a mountain range. TAWS alert 520 may be displayed differently than flight path 502. For example, TAWS alert 520 may be displayed as a blinking red line while flight path 502 may be displayed as a solid white line. TAWS alerts 522-524 may be TAWS alerts associated with one or more terrain elements. In some embodiments, TAWS alert 520 connects TAWS alerts 522-524 to represent a terrain element area such as restricted airspace. In some embodiments, TAWS alerts 522-524 may be displayed as exclamation symbols. In some embodiments, selection of TAWS alerts 520-524 by a user will cause detailed information associated with TAWS alerts 520-524 to be displayed.

Details view 550 may augment map view 500 to display additional information associated with a flight path. Details view 550 may include details 552, destination 570, and TAWS alerts 560-564. Details 552 may be detailed information related to the flight path. For example, details 552 may include wind speed and direction, altitude, pitch, roll, yaw, etc. Destination 570 may be a detailed view of destination 530. Selection of destination 530 and/or other elements of details view 550 may allow a user to modify details view 550 and/or the flight path. TAWS alerts 560-564 may be a details view 550 representation of TAWS alerts 520-524. Selection of TAWS alerts 520-524 may display further information as discussed in reference to FIG. 6.

Figure 6:
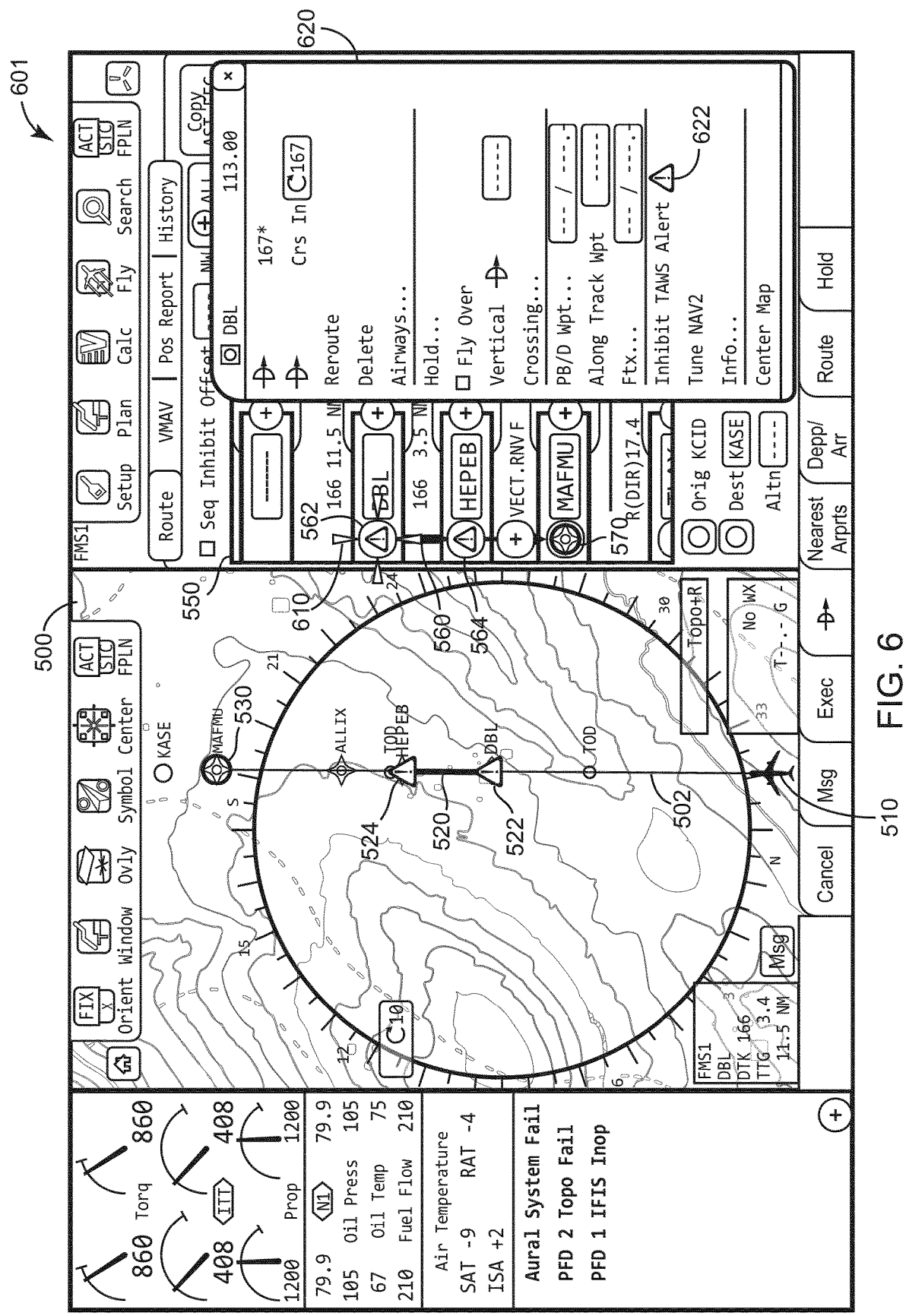
FIG. 6 is an illustration of a user selecting the alert data of FIG. 5, according to an exemplary embodiment.

Referring now to FIG. 6, display screen 601 for viewing and managing TAWS alerts is shown, according to an exemplary embodiment. Display screen 601 shows user selection 610 of TAWS alert 562. User selection is described in greater detail with reference to FIG. 2. User selection 610 of TAWS alert 562 may cause manager 620 to display. Manger 620 may display additional information associated with a TAWS alert (e.g., TAWS alert 562) and may allow a user to manager the TAWS alert. Manager 620 may include inhibit option 622. Inhibit option 622 may cause the selected TAWS alert to become inhibited. For example, a user selection of inhibit option 622 may cause TAWS alerts 562 and 522 to change display and may disable an auditory alarm. Inhibition of TAWS alerts is described in greater detail with reference to FIGS. 2-4. In some embodiments, selection of inhibition option 622 may cause all associated alerts to become inhibited. For example, TAWS alerts 520-524 may all be associated with a single terrain element such as a mountain range wherein selection of inhibition option 622 for just one of TAWS alerts 520-524 may cause all of TAWS alerts 520-524 to become inhibited.

Figure 7:
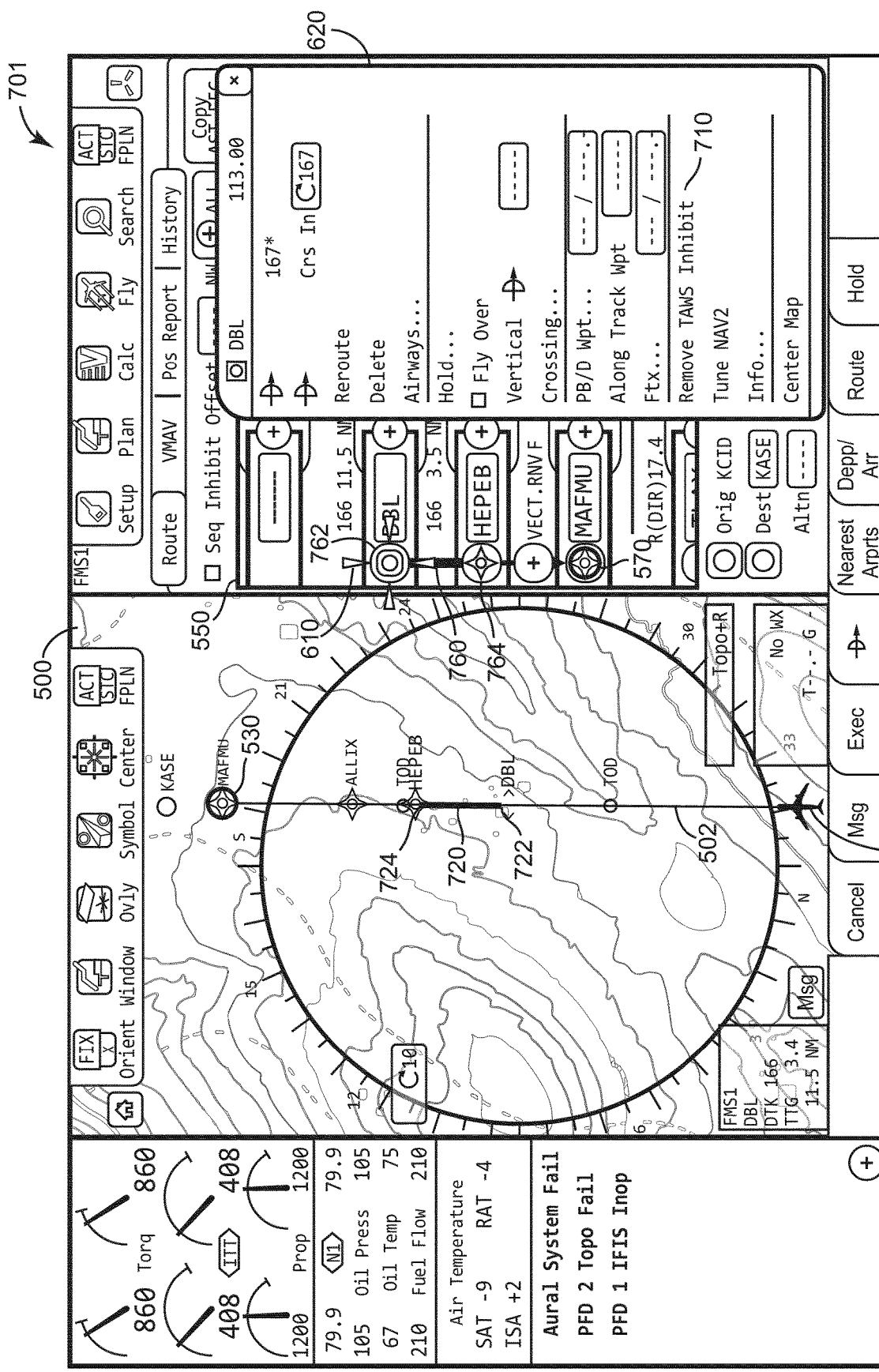
FIG. 7 is an illustration of a user inhibiting the alert data of FIG. 5, according to an exemplary embodiment.

Referring now to FIG. 7, display screen 701 for viewing and managing TAWS alerts is shown, according to an exemplary embodiment. Display(s) 230 may update from display screen 601 to display screen 701 in response to a user selection of inhibition option 622. Display screen 701 shows TAWS alerts 520-524 and 560-564 inhibited to become inhibited alerts 720-724 and 760-764. Inhibited alerts 720-724 may be displayed differently than TAWS alerts 520-524. For example, inhibited alerts 720-724 may remove, replace, and/or modify one or more symbols used to represent the TAWS alert. In some embodiments, inhibited alert 720 may display as a different color than flight path 502 to indicate an inhibited TAWS alert. Inhibited alerts 760-764 may be displayed differently than TAWS alerts 560-564. For example, inhibited alerts 760-764 may remove, replace, and/or modify one or more symbols used to represent the TAWS alert. In some embodiments, inhibited alerts 760-764 may be selected by a user to display manager 620. User selection of uninhibit option 710 may uninhibit one or more inhibited TAWS alerts (e.g., inhibited alerts 720-724 or 760-764). User selection of uninhibit option 710 may cause display screen 601 to display.

As will be appreciated from the above, systems and methods for inhibition of terrain awareness and warning system (TAWS) alerts according to embodiments of the inventive concepts disclosed herein may provide flight crew with detailed and contextualized information relating to TAWS alerts before the alerts occur. Traditional TAWS alerts occur when an aircraft encounters unsafe terrain and lack the ability to "look ahead" of the intended flight path. As a result, traditional systems are prone to numerous TAWS alerts during periods of high pilot workload such as takeoff and landing. Additionally, many such TAWS alerts may be false alerts or may be triggered by a terrain element that does not pose a threat to the aircraft. For example, a TAWS alert may be triggered by a radar indication of routine non-threatening terrain elements at a runway such as a flag pole. To avoid the distraction of nuisance TAWS alerts, many pilots and flight crew personnel use a TAWS inhibition switch to inhibit or silence all TAWS alerts. However, because TAWS inhibition switches inhibit all TAWS alerts, the pilot and/or flight crew no longer receive legitimate TAWS alerts that could prevent controlled flight into terrain (CFIT) accidents. Therefore, a system to individually inhibit TAWS alerts is needed. Furthermore, concepts disclosed herein may allow flight crew to see potential TAWS alerts long before the aircraft ever encounters a potentially dangerous terrain element. Concepts disclosed herein allow for the generation of TAWS alerts based on FMS data such as a flight path. Therefore, instead of being alerted to potentially dangerous terrain elements just before the aircraft encounters them, flight crew may view potentially dangerous terrain elements after determining a flight path and before ever taking off. Viewing TAWS alerts in advance not only allows pilots and/or flight crew to assess the danger posed to the aircraft by the terrain elements and selectively inhibit individual TAWS alerts based on their assessment, but also allows the pilot and/or flight crew to alter a flight path in advance to avoid potentially dangerous terrain elements altogether. Concepts disclosed herein allow pilots to view TAWS alert information in advance and determine based on characteristics of the terrain element associated with the TAWS alert (e.g., altitude, tags, description, etc.) whether the terrain element is a danger to the aircraft based on the flight path. In addition, advanced warning of potentially dangerous terrain elements reduces pilot workload and nuisance TAWS alerts during periods of high pilot workload.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a block chain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of displaying terrain awareness and warning system (TAWS) alerts comprising:
   determining a plurality of warnings relating to terrain near an aircraft flight path, each warning indicating terrain above a threshold elevation and having a position associated with the warning;
   generating, first alert data based on the plurality of warnings configured for display as a plurality of alerts on a display device, wherein the plurality of alerts are configured to be displayed on a map view and an alert manager view on the display device;
   sending the first alert data to the display device;
   receiving, from the display device, a user request to inhibit an individual alert of the plurality of alerts using an inhibit option displayed on the alert manager view, the individual alert based on the first alert data;
   generating second alert data for the individual alert, wherein the second alert data is configured to inhibit the individual alert;
   inhibiting the individual alert by modifying a display of the individual alert on the map view on the display device; and
   sending the second alert data to the display device,
   wherein generating the first alert data comprises inhibiting one or more of the plurality of alerts by default based on one or more rules,
   wherein the one or more rules comprise an altitude comparison, wherein the altitude comparison inhibits the one or more of the plurality of alerts responsive to the aircraft flight path at an alert location being above a threshold altitude,
   wherein the threshold altitude is a cruising altitude of the aircraft flight path,
   wherein the individual alert is already inhibited, and the second alert data is configured to uninhibit the individual alert.

2. The method of claim 1, wherein determining the plurality of warnings comprises comparing flight management system (FMS) data to TAWS data.

3. The method of claim 2, wherein the flight management system (FMS) data is a flight path and the TAWS data is terrain database data, wherein the flight path comprises a vertical profile, intended speed, and intended angle of attack, and wherein the terrain database data comprises terrain element data associated with a location.

4. The method of claim 1, wherein inhibiting the individual alert comprises modifying an audio or tactile representation of the individual alert.

5. The method of claim 1, wherein modifying the display of the individual alert comprises modifying a color of the alert.

6. A system for displaying terrain awareness and warning system (TAWS) alerts comprising:
a display device;
a processing circuit coupled to the display, the processing circuit comprising a processor and memory, the memory having instructions stored thereon that, when executed by the processor, cause the processor to:
determine a plurality of warnings relating to terrain near an aircraft flight path, each warning indicating terrain above a threshold elevation and having a position associated with the warning;
generate, first alert data based on the plurality of warnings configured for display as a plurality of alerts on the display device, wherein the plurality of alerts are configured to be displayed on a map view and an alert manager view on the display device;
send the first alert data to the display device;
receive, from the display device, a user request to inhibit an individual alert of the plurality of alerts using an inhibit option displayed on the alert manager view, the individual alert based on the first alert data;
generate second alert data for the individual alert, wherein the second alert data is configured to inhibit the individual alert;
inhibit the individual alert by modifying a display of the individual alert on the map view on the display device and send the second alert data to the display device,
wherein generating the first alert data comprises inhibiting one or more of the plurality of alerts by default based on one or more rules,
wherein the one or more rules comprise an altitude comparison, wherein the altitude comparison inhibits the one or more of the plurality of alerts responsive to the aircraft flight path at an alert location being above a threshold altitude,
wherein the threshold altitude is a cruising altitude of the aircraft flight path,
wherein the individual alert is already inhibited, and the second alert data is configured to uninhibit the individual alert.

7. The system of claim 6, wherein determining the plurality of warnings comprises comparing flight management system (FMS) data to TAWS data.

8. The system of claim 7, wherein the flight management system (FMS) data is a flight path and the TAWS data is terrain database data, wherein the flight path comprises a vertical profile, intended speed, and intended angle of attack, and wherein the terrain database data comprises terrain element data associated with a location.

9. The system of claim 8, wherein the TAWS data is radar data.

10. The system of claim 6, wherein modifying the display of the individual alert comprises modifying a color of the individual alert.

11. A terrain awareness and warning system (TAWS) comprising:
a terrain database, the terrain database comprising terrain element data associated with a location;
a processing circuit, the processing circuit comprising a processor and memory, the memory having instructions stored thereon that, when executed by the processor, cause the processor to:
receive, from a flight management system, a flight path, wherein the flight path comprises a vertical profile, intended speed, and intended angle of attack;
determine, based on the flight path, a plurality of warnings related to terrain near the flight path, each warning indicating terrain above a threshold elevation and having a position associated with the warning;
generate first alert data based on the plurality of warnings configured for display as a plurality of alerts on a display device, wherein the plurality of alerts are configured to be displayed on a map view and an alert manager view on the display device;
send the first alert data to the display device;
receive, from the display device, a user request to inhibit an individual alert of the plurality of alerts using an inhibit option displayed on the alert manager view, the individual alert based on the first alert data;
generate second alert data for the individual alert, wherein the second alert data is configured to inhibit the individual alert;
inhibit the individual alert by modifying a display of the individual alert on the map view on the display device and send the second alert data to the display device,
wherein generating the first alert data comprises inhibiting one or more of the plurality of alerts by default based on one or more rules,
wherein the one or more rules comprise an altitude comparison, wherein the altitude comparison inhibits the one or more of the plurality of alerts responsive to the aircraft flight path at an alert location being above a threshold altitude,
wherein the threshold altitude is a cruising altitude of the aircraft flight path
wherein the individual alert is already inhibited, the second alert data is configured to uninhibit the individual alert.

12. The system of claim 11, wherein modifying the display of the individual alert comprises modifying a color of the individual alert.

* * * * *